US008971259B2

(12) United States Patent
Teague et al.

(10) Patent No.: US 8,971,259 B2
(45) Date of Patent: *Mar. 3, 2015

(54) PACKET AWARE SCHEDULER IN WIRELESS COMMUNICATION SYSTEMS

(75) Inventors: Edward Harrison Teague, San Diego, CA (US); Gavin Bernard Horn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/030,406

(22) Filed: Feb. 18, 2011

(65) Prior Publication Data

US 2011/0205987 A1    Aug. 25, 2011

Related U.S. Application Data

(63) Continuation of application No. 11/184,602, filed on Jul. 18, 2005, now Pat. No. 7,961,609.

(60) Provisional application No. 60/589,820, filed on Jul. 20, 2004.

(51) Int. Cl.
*H04W 72/04* (2009.01)
*H04W 72/12* (2009.01)
*H04L 12/54* (2013.01)
(Continued)

(52) U.S. Cl.
CPC ....... *H04W 72/1263* (2013.01); *H04L 12/5695* (2013.01); *H04L 47/14* (2013.01); *H04L 47/15* (2013.01); *H04L 47/56* (2013.01); *H04L 47/788* (2013.01); *H04L 47/803* (2013.01); *H04L 47/824* (2013.01); *H04L 67/325* (2013.01); *H04L 67/04* (2013.01); *H04W 28/065* (2013.01); *H04W 28/14* (2013.01); *H04W 28/24* (2013.01); *H04W 72/1205* (2013.01)
USPC ............ 370/329; 370/230; 370/437; 370/335

(58) Field of Classification Search
USPC ......... 370/329, 230, 437, 235, 231, 335, 350, 370/328, 516
See application file for complete search history.

(56) References Cited

U.S. PATENT DOCUMENTS 5,613,207 A    3/1997  Wilson et al.
5,752,193 A *  5/1998  Scholefield et al. ....... 455/452.2
(Continued)

FOREIGN PATENT DOCUMENTS

EP    0999671 A2    5/2000
EP    1089500 A2    4/2001
(Continued)

OTHER PUBLICATIONS

International Search Report—PCT/US05/025856, International Searching Authority—European Patent Office, Jan. 27, 2006.
(Continued)

*Primary Examiner* — Rasheed Gidado
(74) *Attorney, Agent, or Firm* — Howard Seo

(57) ABSTRACT

Apparatuses and methodologies are described that facilitate packet aware scheduling are provided. In some embodiments, if all of the information of a packet cannot be scheduled in a single transmission period, additional resources may be assigned to transmission of the contents of the packet based upon latency requirements and/or transmission constraints of the packet.

17 Claims, 8 Drawing Sheets

(51) Int. Cl.
*H04L 12/801* (2013.01)
*H04L 12/875* (2013.01)
*H04L 12/911* (2013.01)
*H04L 12/927* (2013.01)
*H04L 29/08* (2006.01)
*H04W 28/06* (2009.01)
*H04W 28/14* (2009.01)
*H04W 28/24* (2009.01)

(56) References Cited

U.S. PATENT DOCUMENTS

| | | | |
|---|---|---|---|
| 6,760,328 B1 * | 7/2004 | Ofek | 370/389 |
| 6,952,454 B1 | 10/2005 | Jalali et al. | |
| 7,263,064 B2 * | 8/2007 | Yoshimura et al. | 370/235 |
| 7,295,558 B2 | 11/2007 | Dubuc | |
| 7,961,609 B2 | 6/2011 | Teague et al. | |
| 8,111,689 B2 * | 2/2012 | Naim et al. | 370/386 |
| 2002/0090004 A1 * | 7/2002 | Rinchiuso | 370/468 |
| 2002/0126675 A1 | 9/2002 | Yoshimura et al. | |
| 2002/0137464 A1 | 9/2002 | Dolgonos et al. | |
| 2003/0043839 A1 | 3/2003 | Luschi et al. | |
| 2003/0063604 A1 * | 4/2003 | Wallner et al. | 370/386 |
| 2003/0095571 A1 | 5/2003 | Speight | |
| 2004/0202181 A1 * | 10/2004 | Mitchell | 370/395.4 |
| 2005/0105493 A1 * | 5/2005 | Rai et al. | 370/335 |
| 2005/0207436 A1 * | 9/2005 | Varma | 370/412 |
| 2005/0265371 A1 * | 12/2005 | Sharma et al. | 370/428 |

FOREIGN PATENT DOCUMENTS

| | | |
|---|---|---|
| JP | 2000151619 | 5/2000 |
| JP | 2001292476 A | 10/2001 |
| JP | 2002271366 A | 9/2002 |
| JP | 2003018117 | 1/2003 |
| JP | 2003087343 A | 3/2003 |
| JP | 2004503181 | 1/2004 |
| WO | 0205506 | 1/2002 |
| WO | 0239760 A2 | 5/2002 |

OTHER PUBLICATIONS

Written Opinion—PCT/US05/025856, International Searching Authority—European Patent Office, Jan. 27, 2006.

* cited by examiner

PACKET AWARE SCHEDULER IN WIRELESS COMMUNICATION SYSTEMS

CROSS-REFERENCE TO RELATED APPLICATIONS

Claim of Priority under 35 U.S.C. §119

The present application is a continuation of U.S. application Ser. No. 11/184,602, filed Jul. 18, 2005, entitled PACKET AWARE SCHEDULER IN WIRELESS COMMUNICATION SYSTEMSM, which application claims the benefit from U.S. Provisional Patent application Ser. No. 60/589,820, entitled Packet Aware Scheduler and filed Jul. 20, 2004, the entirety of which is hereby incorporated by reference.

BACKGROUND

I. Field

The following description relates generally to wireless communications and, amongst other things, to scheduling resource assignments to user devices in a wireless network environment.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones and access terminals has led to an increase in the types of applications, and their complexity, available for use in wireless communication systems. These services all have different requirements for bandwidth and latency.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

CDM based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. In these systems the bandwidth and other system resources are assigned according to a scheduler.

In addition, in a typical communication network, information is assigned to different levels of service based upon the application or service for which the information is utilized. For example, certain applications, such as voice or video generally require low latency while others such as simple data requests may have higher allowable latencies.

The purpose of a scheduler in a communication system is to multiplex the data from users to the bandwidth for multiple transmissions. The scheduler may multiplex the users' transmissions over the time, frequency, code, and/or space. The goals of a scheduler are to maximize the system capacity (throughput) while maintaining a specified level of fairness among users and/or throughput for each user. In addition, the scheduler would like to provide service to particular users that best serves the applications that are running on the user's connection, e.g. the service or application being provided. For example, the scheduler would like to meet latency targets for connections that are running latency sensitive applications. The scheduler goals above are often conflicting, and a particular scheduler may emphasize certain goals (such as overall sector capacity).

In view of at least the above, there exists a need in the art for a system and/or methodology of improving wireless communication and frequency resource allocation to users in a wireless network environment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

[To be added to Finalized Claims]

DETAILED DESCRIPTION

Figure 1:
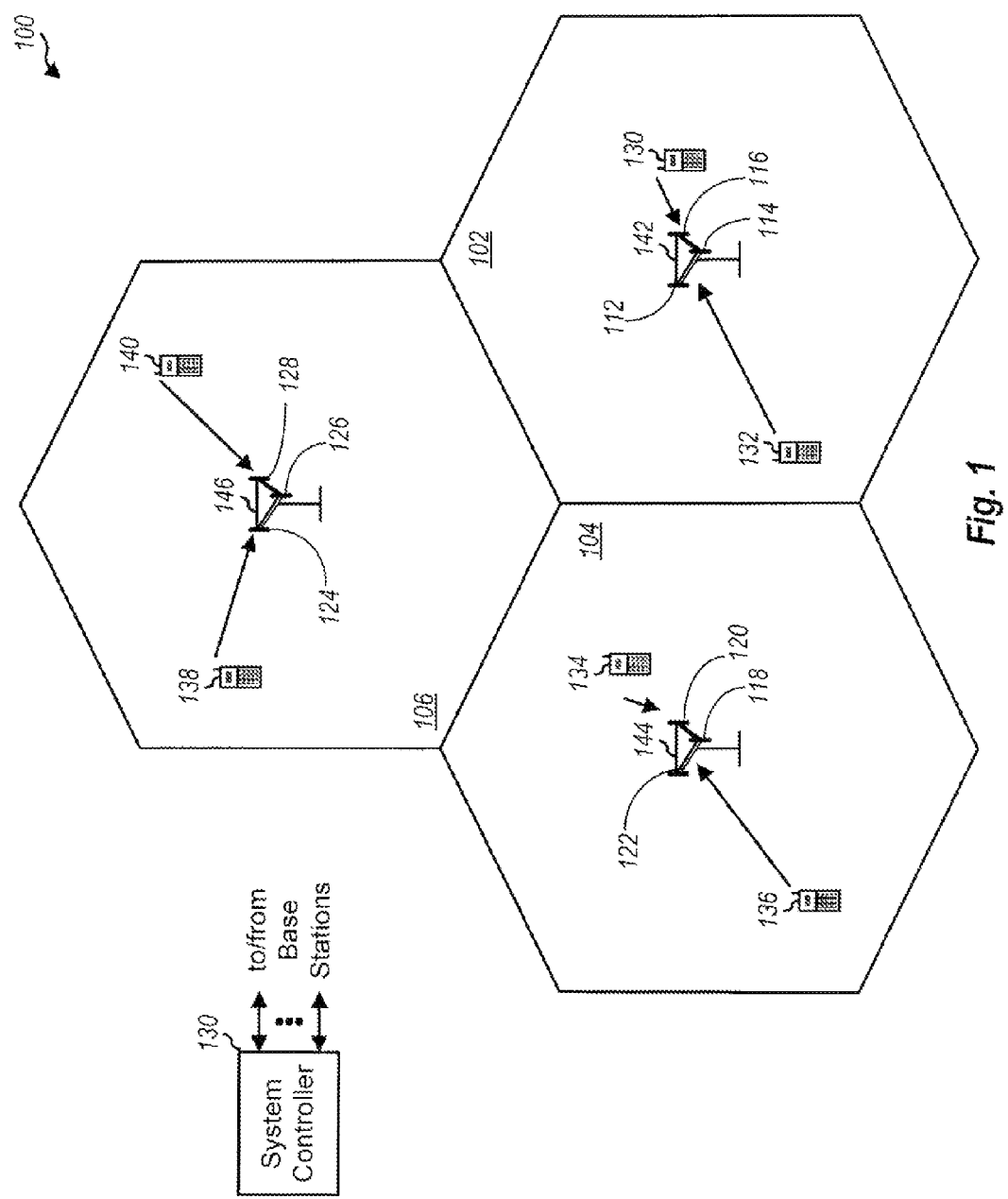
FIG. 1 illustrates a multiple access wireless communication system according to an embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors are formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other embodiments, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

Figure 2:
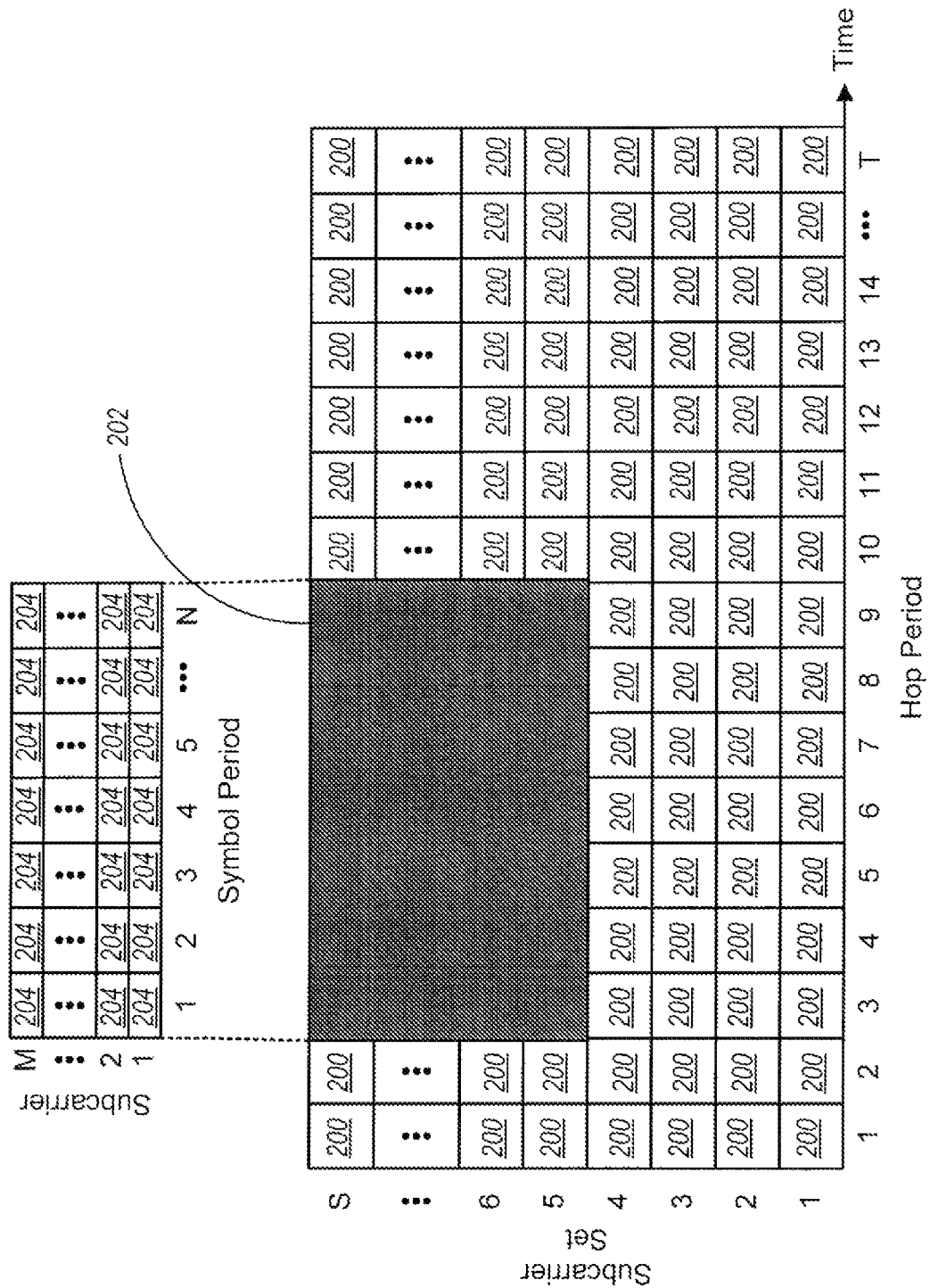
FIG. 2 illustrates a spectrum allocation scheme for a multiple access wireless communication system according to an embodiment.

Referring to FIG. 2, a spectrum allocation scheme for a multiple access wireless communication system is illustrated. A plurality of OFDM symbols 200 are allocated over T symbol periods and S frequency subcarriers. Each OFDM symbol 200 comprises one symbol period of the T symbol periods and a tone or frequency subcarrier of the S subcarriers.

In an OFDM frequency hopping system, one or more symbols 200 may be assigned to a given access terminal. In one embodiment of an allocation scheme as shown in FIG. 2, one or more hop regions, e.g. hop region 202, of symbols to a group of access terminals for communication over a reverse link. Within each hop region, assignment of symbols may be randomized to reduce potential interference and provide frequency diversity against deleterious path effects.

Each hop region 202 includes symbols 204 that are assigned to the one or more access terminals that are in communication with the sector of the access point and assigned to the hop region. During each hop period, or frame, the location of hop region 202 within the T symbol periods and S subcarriers varies according to a hopping sequence. In addition, the assignment of symbols 204 for the individual access terminals within hop region 202 may vary for each hop period.

The hop sequence may pseudo-randomly, randomly, or according to a predetermined sequence, select the location of the hop region 202 for each hop period. The hop sequences for different sectors of the same access point are designed to be orthogonal to one another to avoid "intra-cell" interference among the access terminal communicating with the same access point. Further, hop sequences for each access point may be pseudo-random with respect to the hop sequences for nearby access points. This may help randomize "inter-cell" interference among the access terminals in communication with different access points.

In the case of a reverse link communication, some of the symbols 204 of a hop region 202 are assigned to pilot symbols that are transmitted from the access terminals to the access point. The assignment of pilot symbols to the symbols 204 should preferably support space division multiple access (SDMA), where signals of different access terminals overlapping on the same hop region can be separated due to multiple receive antennas at a sector or access point, provided enough difference of spatial signatures corresponding to different access terminals.

It should be noted that while FIG. 2 depicts hop region 200 having a length of seven symbol periods, the length of hop region 200 can be any desired amount, may vary in size between hop periods, or between different hopping regions in a given hop period.

The symbols, hop regions, or the like generally do not map one to one with respect to the packets in terms of size or timing. This creates the need to fragment the packets and to assemble symbols from the fragmented bits, which increases the difficulty in scheduling the information bits contained in packets in an appropriate fashion.

It should be noted that while the embodiment of FIG. 2 is described with respect to utilizing block hopping, the location of the block need not be altered between consecutive hop periods.

It should be note that while the embodiment of FIG. 2, relates to and OFDMA system utilizing block hopping the current disclosure may be operated in many different communication systems. In an embodiment, the communication system utilized may be a time-division multiplexed system where each user is assigned one or more time slots, or portions thereof, in one or more frames, periods, or the like. In such embodiments, each time slot may comprise multiple transmission symbols. Further embodiments, may utilize CDMA or FDMA schemes, where each user is assigned transmission resources based upon other criteria, so long as those resources may be divided or limited.

Figure 3:
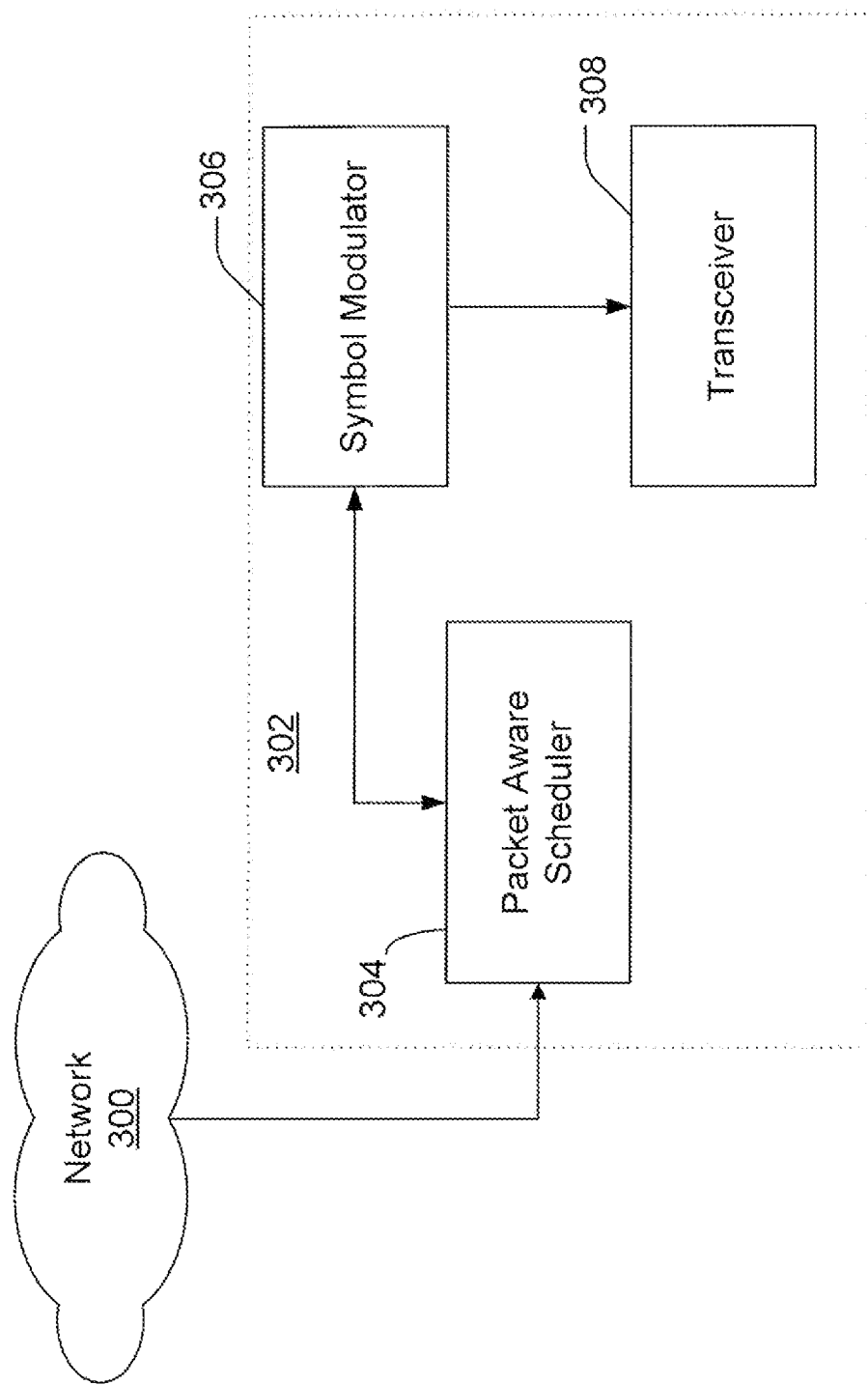
FIG. 3 illustrates a simplified block diagram of a system that facilitates packet aware resource allocation according to an embodiment.

Referring to FIG. 3, a simplified block diagram of a system that facilitates packet aware resource allocation according to an embodiment is illustrated. A network 300 transmits and receives packets from the wireless communication system 302. Packets received from the network 300 have a first format that is of a specified number of bits based upon the communication protocol utilized by the network. Scheduler 304 assigns packets and portions of packets, depending on their size and information content, to channel resources. These channel resources may be, for example, OFDM symbols 200 or other transmission symbols. In any communication system, the number of channel resources, e.g. OFDM symbols, time slots, CDMA codes, or the like, available for any given time period is limited by the system parameters. Therefore, the scheduler 304 determines the channel resources to which to assign the information bits contained within each packet based, in part, on whether the entire information content of a packet may transmitted within a number of symbols, time slots, hop regions, or the like, for a given time period given by the application to which the packet belongs.

Scheduler 304 can employ a full packet scheduling requirement in addition to a quality of service (QoS), proportional fairness criteria, other scheduling approaches, or combinations thereof. That is, one of the factors utilized in deciding the schedule of symbols transmitted from the wireless communication system 302 is whether the information bits contained in the packets, which have certain latency constraints based upon their application, can be transmitted within a time frame, required by the application, and defined by the symbol, time slot, hop region, or the like of the wireless communication system. For example, if a packet is a video application packet intended for user A, scheduler 304 determines the number of bits in the packet and will determine the number of transmission symbols required to transmit the contents of the video application packet. Then, scheduler 304 may schedule transmission to user A, based upon the QoS of the user, fairness criteria, other scheduling approach, or combinations thereof. However, in those cases where the entirety of the information bits contained in the video application packet cannot be transmitted in a required time period, scheduler 304 will make a determination based upon the latency requirements of the video application whether to schedule the transmission of the symbols corresponding to the information bits contained in the video application packet in another portion of the hop period, frame, or transmission time period or to attempt to allocate additional resources to the information bits, contained in the video application packet, within the current hop period, frame, transmission time period, or the like. The additional transmission resources may be those allocated to other users, or may be additional resources such as shared data channels or the like.

Scheduler 304 may reside in a single wireless communication device, such as a base station or access point, or may be distributed within multiple wireless communication devices, such as between a base station or access point controller and the base station or access point.

After being scheduled, the information bits from the packets is modulated by modulator 306 and provided to transceiver 308 for transmission via one or more antennas to the access terminals.

Wireless communication system 302 can provide communication service to users in conjunction with an OFDM protocol, OFDMA protocol, a CDMA protocol, a TDMA protocol, a combination thereof, or any other suitable wireless communication protocol.

Figure 4:
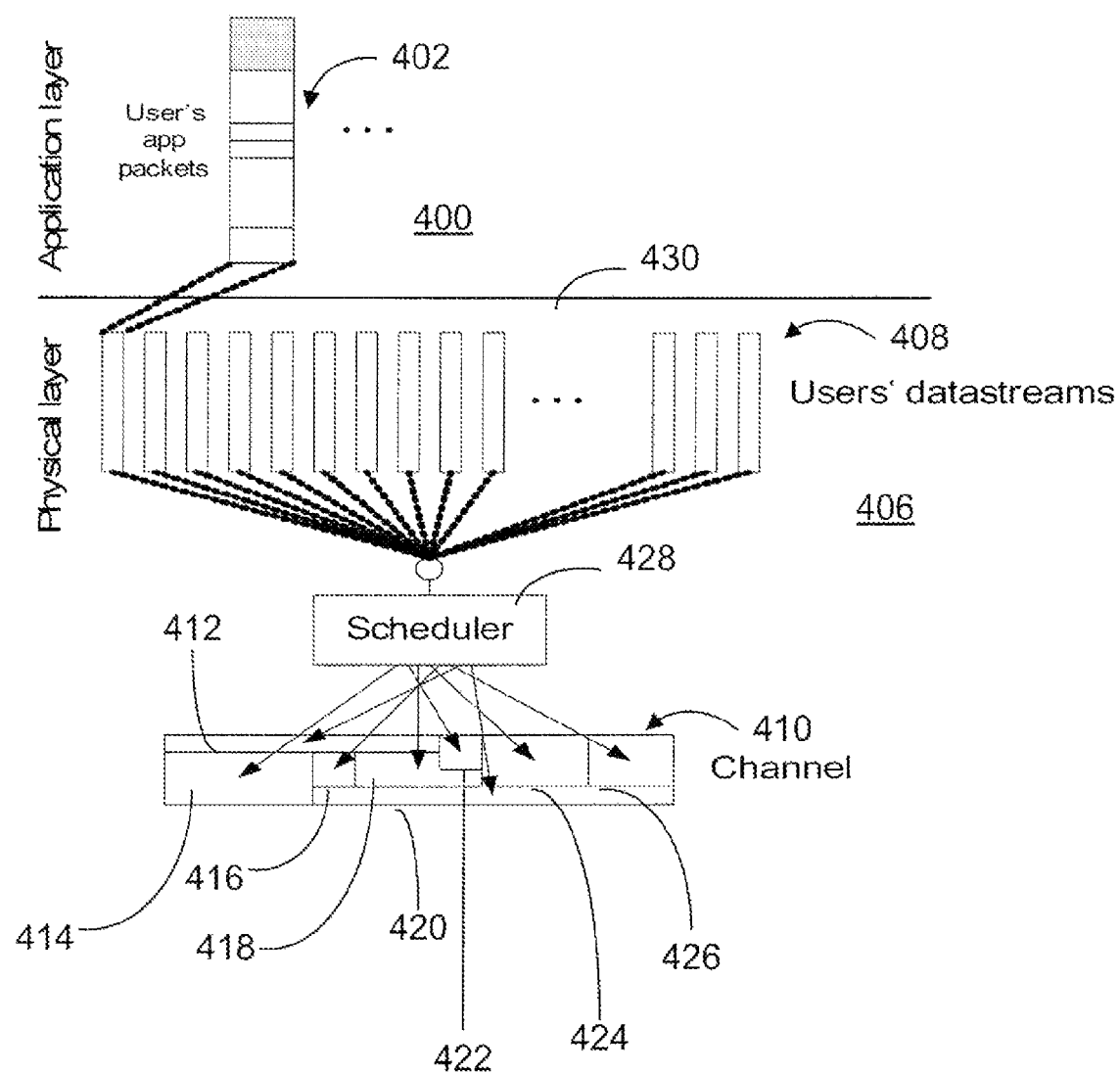
FIG. 4 illustrates a functional block diagram of a scheduler according to an embodiment.

Referring to FIG. 4, a functional block diagram of a scheduler according to an embodiment is illustrated. Information received from a network is generally termed to be at the application layer 400 or other higher layers. The information is typically contained in packets 402. These packets 402 generally have a size in bits, and may include a timestamp indicating when the data was created by the different applications that generated the packets. The latency requirements of the applications may be known based upon the information type identified in each packet, for example. In order to transmit, over a wireless interface, the information bits contained in packets 402 the physical layer 406 needs to generate transmission symbols 408 that are of the appropriate size and format for transmission via channel 410.

Channel 410 includes a plurality of portions 412-426 that each are utilized for different purposes. For example, some portions may be utilized for transmitting control information, such as power control or reverse link scheduling information, while others may be utilized for transmitting data to one or more access terminals. The resources of some portions 412-426 may be used for multiple purposes, to allow for flexibility in utilizing channel resources, of transmission for different purposes based upon the types of information being transmitted or channel conditions for each user.

There are two main interface options for translating the information bits contained in the packets at the application layer 400 and to the transmission symbols, or other channel resources, of the physical layer 406. The first is a bit interface that transfers information from the application layer to the physical layer in chunks of bits. The physical layer can request and transmit bits in arbitrarily sized chunks, based upon its own transmission symbol sizes. The second type of interface is a packet interface that transfers information from the application layer to the physical layer in chunks of packets. These packets may or may not be provided in equal size chunks to the scheduler 428.

The bit interface has the advantage that the physical layer 406 does not have restrictions on the size of data that can be processed. This simplifies the scheduler operation because it can schedule whatever sized chunk fits in the available channel resource. However, the disadvantage is that without taking into account application level features, the application performance may suffer due to inefficient fragmentation of application packets. Further, the application latency needs cannot be addressed by a scheduler that does not have knowledge of the application packet latency. On the other hand, the packet interface has the advantage that the scheduler has access to application packet details such as packet boundaries. The disadvantage is that the scheduler may not have channel resources available to efficiently multiplex many users onto the channel.

Scheduler 428 utilizes a hybrid interface 430 that includes the functionality of a bit interface and a packet interface. The hybrid interface 430 provides the ability of the physical layer to pull arbitrarily sized chunks of data from the application to enable efficient scheduling and multiplexing on limited resources in the channel. However, unlike the bit interface, this hybrid interface 430 provides the scheduler 428 with information associated with the application packets that can be useful for scheduling purposes. For example, when the physical layer requests bits, it is provided with information about the remaining number of bits in the current packet, and the timestamp of the packet. Furthermore, the hybrid interface 430 may also provide packet size and timestamp information of other packets waiting in the application queue to be passed to the physical layer.

In one embodiment, scheduler 428 my make use of the information available via the hybrid interface 430 to reduce the likelihood of fragmented application packets. If the scheduler 428 has knowledge of a packet boundary, it can attempt to schedule the remainder of the packet within the current hop period or other time frame, even if this might be difficult with respect to available channel resources. The scheduler 428 may use the number of remaining bits, the latency sensitivity, and the difficulty of obtaining channel resources to make the decision of whether or not to fragment the application packet, or to schedule the entire packet in the current hop period or other time period.

One advantage of utilizing this hybrid interface 430 is that it enables the scheduler 428 to use both the physical channel constraints and application constraints to optimize use of the channel and performance of the application simultaneously.

Figure 5A:
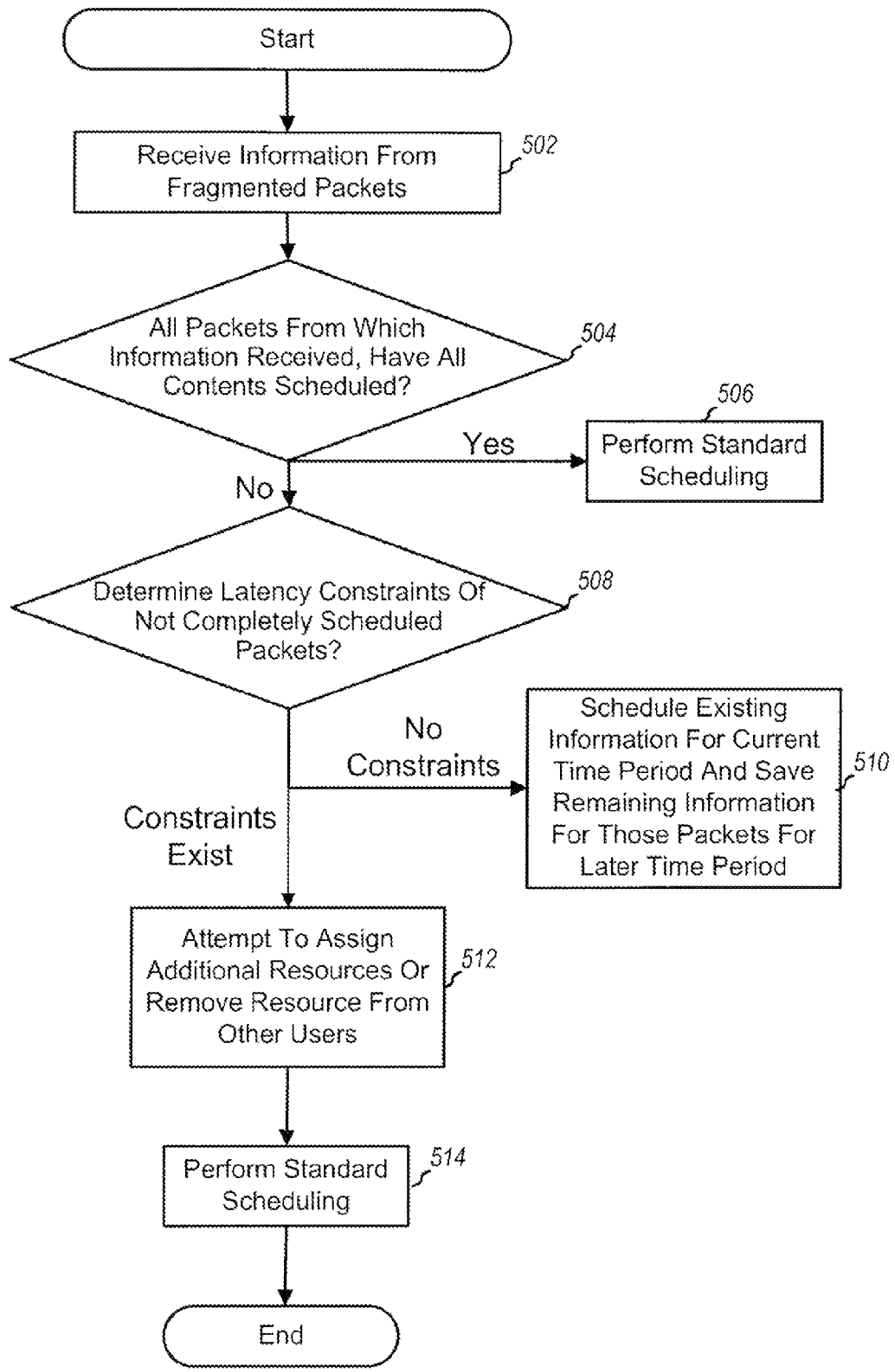
FIG. 5A illustrates a methodology for scheduling according an embodiment.
Figure 5B:
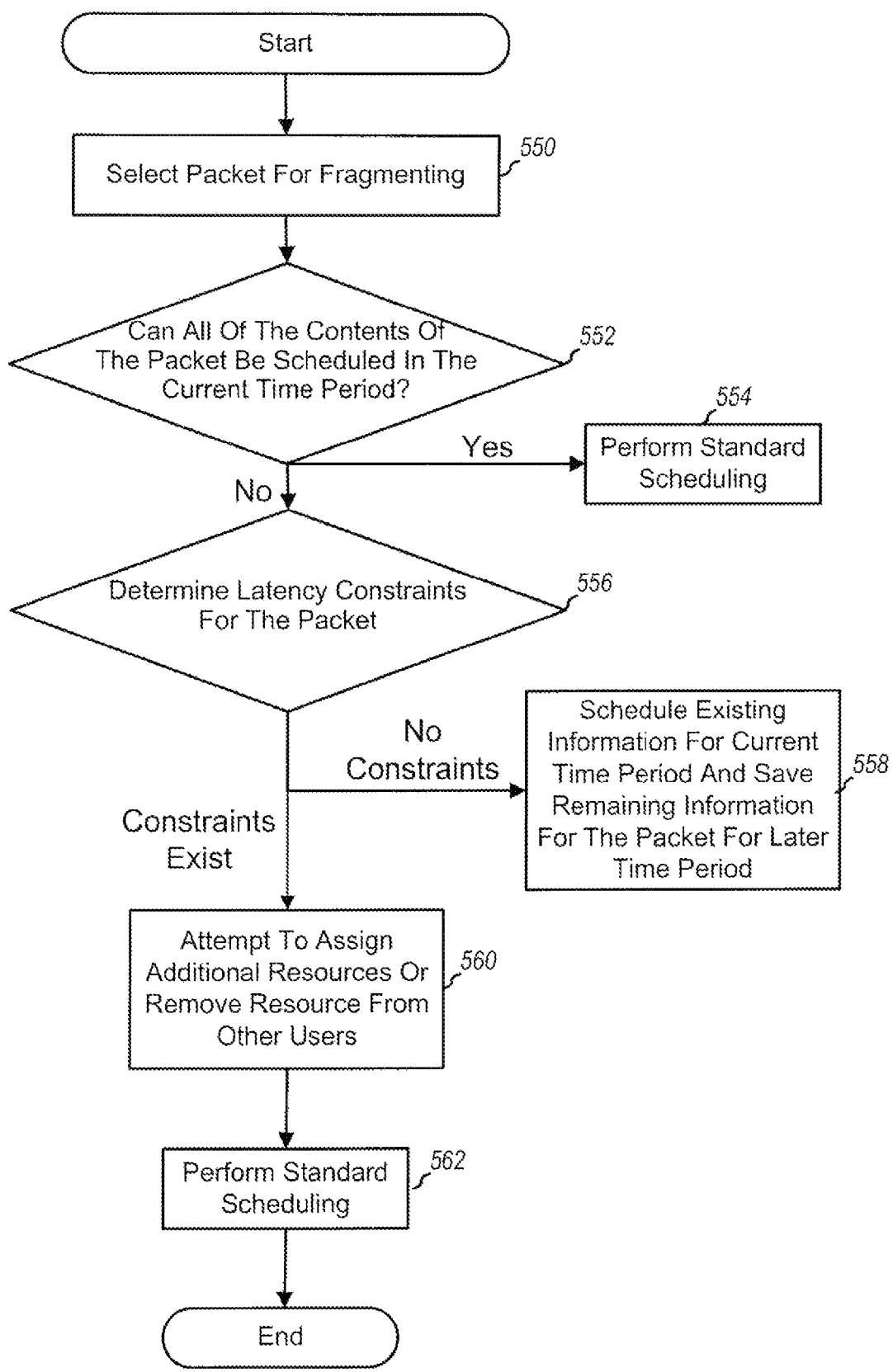
FIG. 5B illustrates a methodology for scheduling according another embodiment.
Figure 5C:
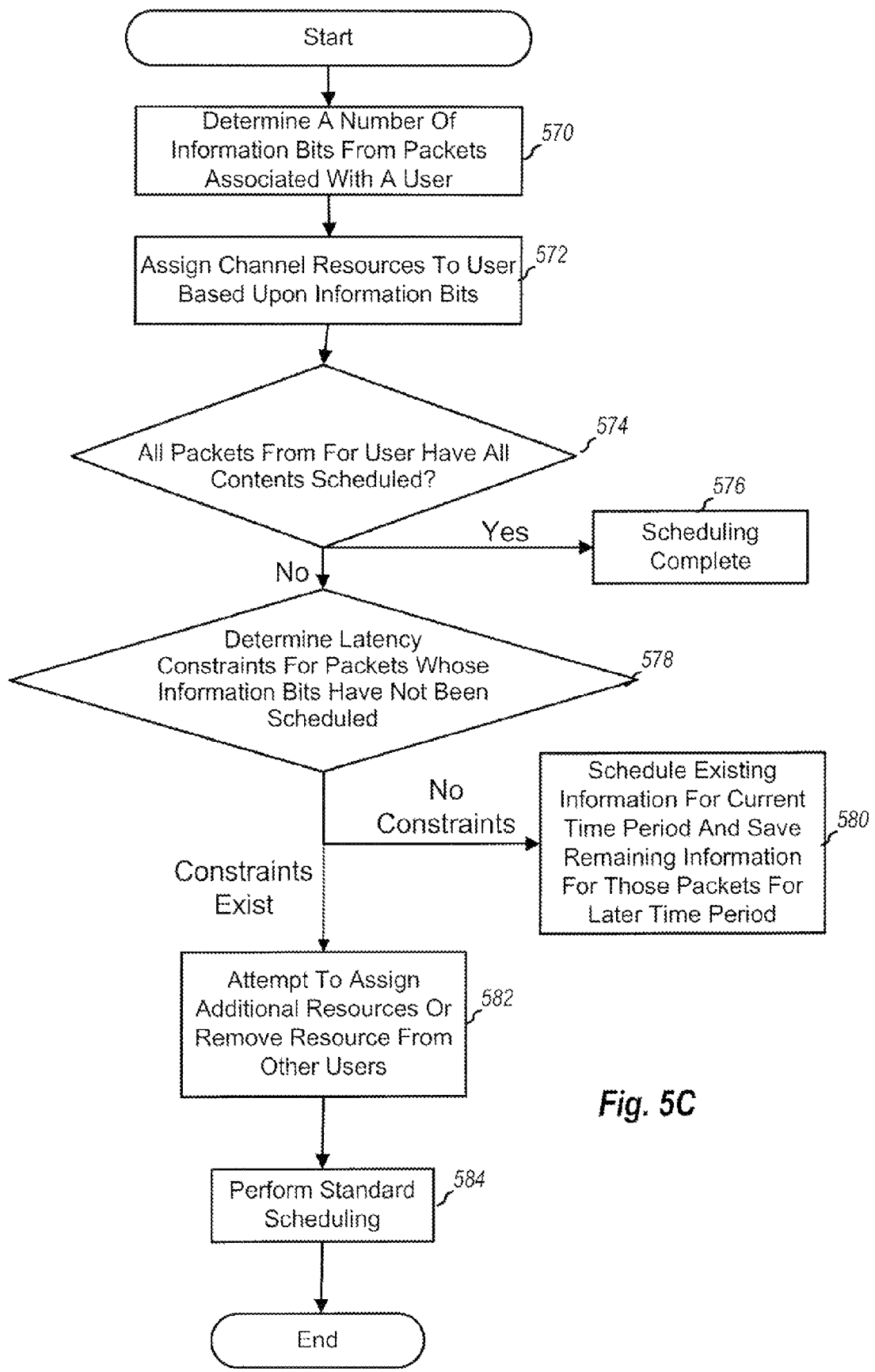
FIG. 5C illustrates a methodology for scheduling according a further embodiment.

Referring to FIGS. 5A, 5B, and 5C, methodologies for scheduling according multiple embodiments are illustrated. For example, the methodologies may relate to packet-aware scheduling in an OFDM environment, an OFDMA environment, a CDMA environment, a TDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, a methodology could alternatively be represented as a series of interrelated states or events, such as in a state diagram. Moreover, not all illustrated acts may be required to implement a methodology in accordance with one or more embodiments.

In FIG. 5A, information bits from a plurality of packets are received at the physical layer via a hybrid interface, block 502. Then a determination is made as to whether the information bits to be scheduled have been provided from packets for which all of the contents will be scheduled during the current time period, block 504. In the case where the contents of each packet from which information bits have been provided for scheduling can be scheduled in the current time period, the packets are scheduled according to the scheduling algorithms of the system, block 506. The scheduling algorithms may be based upon quality of service (QoS), proportional fairness criteria, other scheduling approaches, or combinations thereof.

If the contents of each packet from which information bits have been provided for scheduling has not been provided for scheduling or cannot be scheduled during the current time period, a determination is made as to the latency constraints and/or other transmission requirements of the contents of those packets, block 508.

If there are no latency constraints and/or other transmission requirements that prevent the remaining information bits to be transmitted in a later time period, the information bits for those packets are removed from scheduling during the current time period, block 510. If there are latency constraints and/or other transmission requirements that require transmission of the packet in the current time period, the scheduler attempts to add additional channel resources for transmission to the user of the packet or to remove channel resources from other users, block 512, to allow all of the information bits from those packets that have the latency constraints and/or other transmission requirements. The system then schedules according to the scheduling algorithms of the system, block 514.

In FIG. 5B, a packet is selected for fragmenting to be provided to the scheduler, block 550. Then a determination is made as to whether there exist sufficient channel resources, in the current time period, to schedule all of the information bits from the packet, block 552. In the case where the contents of the packet for can be scheduled in the current time period, the packet is fragmented and provided for scheduling according to the scheduling algorithms of the system, block 554. The scheduling algorithms may be based upon quality of service (QoS), proportional fairness criteria, other scheduling approaches, or combinations thereof. If the contents of the packet cannot be scheduled during the current time period, a determination is made as to the latency constraints and/or other transmission requirements of the contents of the packet, block 556.

If there are no latency constraints and/or other transmission requirements that prevent the remaining information bits of the packet to be transmitted in a later time period, the packet is fragmented and the information bits, for which there exist channel resources, is provided for scheduling during the current time period, block 558. The remaining information bits from the fragmented packet are maintained in one or more queues for scheduling in later time periods.

If there are latency constraints and/or other transmission requirements that require transmission of the packet in the current time period, the scheduler attempts to add additional channel resources for transmission to the user of the packet or to remove channel resources from other users, block 560, to allow all of the information bits from those packets that have the latency constraints and/or other transmission requirements.

The system then schedules according to the scheduling algorithms of the system, block 562.

In FIG. 5C, a number of information bits to be scheduled for a user is determined, block 570. This may be determined based upon a number of packets stored for that user, the number of packets to be transmitted in an upcoming time period, or some other approach. Channel resources are then assigned to each user based upon the number of information bits in the packets, block 572. In many cases, a user may be assigned a number of resources up to a fixed amount or up to an initial amount, depending on system loading, to allow multiple users to access the channel resources for a transmission period. As such, even though the system attempts to allocate channel resources based upon the information bits from fragmented packets, at least in the first instance such allocation may not be fully done. The allocation of the channel resources may be performed according to the scheduling algorithms of the system. The scheduling algorithms may be based upon quality of service (QoS), proportional fairness criteria, other scheduling approaches, or combinations thereof.

After the channel resources are allocated, a determination is made whether all of the information bits from the fragmented packets for the user have been allocated channel resources in the current time period, block 574. In the case where all of the information bits from the fragmented packets have been allocated channel resources in the current time period, the scheduling is deemed complete, block 576. In the case where all of the information bits from the fragmented packets have not been allocated channel resources in the current time period, a determination is made as to the latency constraints and/or other transmission requirements of the contents of those packets from which not all of the information bits have not been allocated resources, block 578.

If there are no latency constraints and/or other transmission requirements that prevent the remaining information bits of the packet to be transmitted in a later time period, the packet is fragmented and the information bits, for which there exist channel resources, is provided for scheduling during the current time period, block 580. The remaining information bits from the fragmented packet are maintained in one or more queues for scheduling in later time periods.

If there are latency constraints and/or other transmission requirements that require transmission of the packets in the current time period, the scheduler attempts to add additional channel resources for transmission to the user of the packet or to remove channel resources from other users, block 582, to allow all of the information bits from those packets that have the latency constraints and/or other transmission requirements. The system then schedules according to the scheduling algorithms of the system, block 584.

Figure 6:
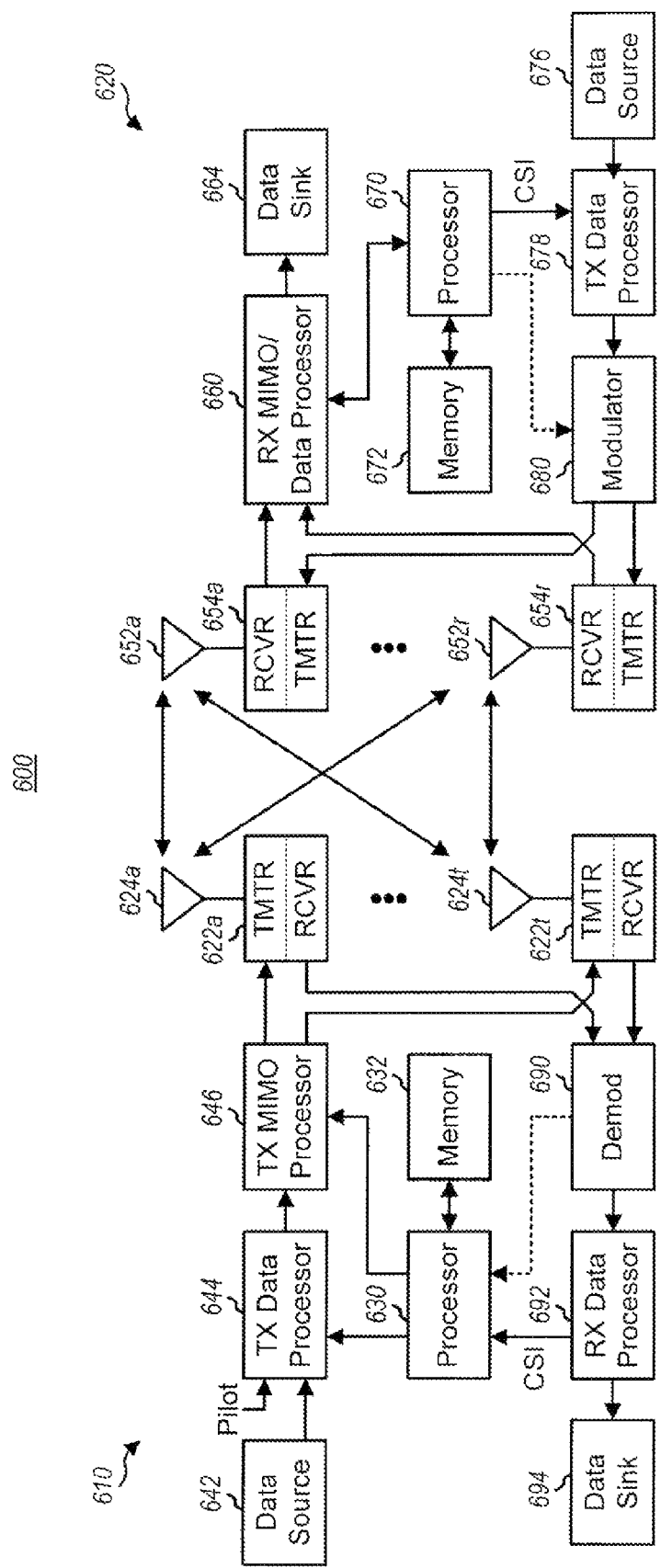
FIG. 6 illustrates a transmitter and receiver in a multiple access wireless communication system one embodiment

Referring to FIG. 6, a transmitter and receiver in a multiple access wireless communication system one embodiment is illustrated. At transmitter system 610, traffic data for a number of data streams is provided from a data source 612 to a transmit (TX) data processor 614. In an embodiment, each data stream is transmitted over a respective transmit antenna. TX data processor 614 formats, codes, and interleaves the traffic data for each data stream based on a particular coding scheme selected for that data stream to provide coded data. In some embodiments, TX data processor 614 applies beamforming weights to the symbols of the data streams based upon the user to which the symbols are being transmitted. In some embodiments, the beamforming weights may be generated based upon eigenbeam vectors generated at the receiver 602 and provided as feedback to the transmitter 600. Further, in those cases of scheduled transmissions, the TX data processor 614 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 430.

The modulation symbols for all data streams are then provided to a TX MIMO processor 620, which may further process the modulation symbols (e.g., for OFDM). TX MIMO processor 620 then provides $N_T$ modulation symbol streams to $N_T$ transmitters (TMTR) 622a through 622t. In certain embodiments, TX MIMO processor 620 applies beamforming weights to the symbols of the data streams based upon the user to which the symbols are being transmitted and the antenna from which the symbol is being transmitted from that users channel response information.

Each transmitter 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 622a through 622t are then transmitted from $N_T$ antennas 624a through 624t, respectively.

At receiver system 650, the transmitted modulated signals are received by $N_R$ antennas 652a through 652r and the received signal from each antenna 452 is provided to a respective receiver (RCVR) 654. Each receiver 654 conditions (e.g., filters, amplifies, and downconverts) a respective received signal, digitizes the conditioned signal to provide samples, and further processes the samples to provide a corresponding "received" symbol stream.

An RX data processor 660 then receives and processes the $N_R$ received symbol streams from $N_R$ receivers 654 based on a particular receiver processing technique to provide $N_T$ "detected" symbol streams. The processing by RX data processor 660 is described in further detail below. Each detected symbol stream includes symbols that are estimates of the modulation symbols transmitted for the corresponding data stream. RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610.

The channel response estimate generated by RX processor 660 may be used to perform space, space/time processing at the receiver, adjust power levels, change modulation rates or schemes, or other actions. RX processor 660 may further estimate the signal-to-noise-and-interference ratios (SNRs) of the detected symbol streams, and possibly other channel characteristics, and provides these quantities to a processor 670. RX data processor 660 or processor 670 may further derive an estimate of the "operating" SNR for the system. Processor 670 then provides estimated channel state information (CSI), which may comprise various types of information regarding the communication link and/or the received data stream. For example, the CSI may comprise only the operating SNR. The CSI is then processed by a TX data processor 638, which also receives traffic data for a number of data streams from a data source 676, modulated by a modulator 680, conditioned by transmitters 654a through 454r, and transmitted back to transmitter system 610.

At transmitter system 610, the modulated signals from receiver system 650 are received by antennas 624, conditioned by receivers 622, demodulated by a demodulator 640, and processed by a RX data processor 642 to recover the CSI reported by the receiver system. The reported CSI is then provided to processor 630 and used to (1) determine the data rates and coding and modulation schemes to be used for the data streams and (2) generate various controls for TX data processor 614 and TX MIMO processor 620.

The information stored in data sources 642 and 676 is scheduled by scheduler based upon a scheduler as discussed with respect to FIGS. 1-5.

While FIG. 6 and the associated discussion refers to a MIMO system, other systems multi-input single-input (MISO) and single-output multi-input (SIMO) may also utilize the structures of FIG. 6 and the structures, methods and systems discussed herein.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that facilitates scheduling in a wireless communication environment, comprising:
 a scheduler that schedules information obtained from application packets to channel resources; and
 a hybrid interface that provides to the scheduler (i) in arbitrarily sized chunks, a subset of less than all of the information in one of the packets and (ii) information associated with the packet from which the subset is drawn, wherein the associated information comprises an indication of a remaining number of bits in the packet from which the subset is drawn.

2. The apparatus of claim 1, wherein the associated information comprises a timestamp of the packet from which the subset is drawn.

3. The apparatus of claim 1, wherein the scheduler determines if all information from each of the application packets has been scheduled for a single transmission period or if all of the information from each of the application packets has not been scheduled for the single transmission period, and determines from the associated information latency constraints and/or transmission constraints for those packets for which not all of the information has been scheduled.

4. The apparatus of claim 3, wherein the scheduler, if there are latency constraints and/or transmission constraints for any application packet, assigns additional resources to schedule transmission of all information bits in the single transmission period for that application packet.

5. The apparatus of claim 3, wherein the scheduler, if there are no latency constraints and/or transmission constraints for an application packet, schedules transmission of all information bits for that application packet in multiple transmission periods.

6. The apparatus of claim 1, wherein the apparatus comprises a base station or an access point.

7. An electronic device comprising:
 a memory that stores a plurality of packets for a user including information to be transmitted over a wireless link, each of the plurality of packets comprising a plurality of bits; and
 a processor coupled with the memory, the processor configured to fragment each of the plurality of packets into arbitrarily sized subsets of less than all the bits in the packet and to determine an assignment of transmission resources, for transmission over the wireless link to the user, based upon a number of remaining bits in each packet being fragmented.

8. The electronic device of claim 7, further comprising a hybrid interface that determines the number of information bits in each packet being fragmented.

9. The electronic device of claim 7, further comprising a scheduler that determines whether to attempt to schedule additional transmission resources to the user based on latency constraints of an application of any packet for which not all of the bits have been scheduled in a single transmission period.

10. The electronic device of claim 7, wherein the processor is further configured to allow transmission of the bits from a packet in multiple transmission periods unless a latency constraint of an application of the packet prevents such transmission.

11. A method for scheduling transmission over a wireless link, comprising:
 fragmenting, at a transmitting entity, each of a plurality of packets to be transmitted over the wireless link for a user into arbitrarily sized subsets of less than all the bits in the packet;
 determining, at the transmitting entity, a remaining number of bits of each of the plurality of packets to be transmitted over the wireless link; and
 scheduling, at the transmitting entity, transmission resources for the user based in part upon the remaining number of bits in each packet being fragmented.

12. The method of claim 11, further comprising, if there are latency constraints and/or transmission constraints for a packet, assigning additional resources to schedule transmission of the packet for the user in a single transmission period.

13. The method of claim 11, further comprising, if there are no latency constraints and/or transmission constraints for a packet, scheduling transmission for the information of the packet in multiple transmission periods.

14. An apparatus for scheduling transmission over a wireless link, comprising:
 means for fragmenting at the apparatus each of a plurality of packets to be transmitted over the wireless link for a user into arbitrarily sized subsets of less than all the bits in the packet;
 means for determining at the apparatus a remaining number of bits of each of the plurality of packets to be transmitted over the wireless link; and
 means for scheduling at the apparatus transmission resources for the user based in part upon the remaining number of bits in each packet being fragmented.

15. A non-transitory computer-readable medium comprising code, which, when executed by a processor, causes the processor to perform operations for scheduling transmission over a wireless link, the non-transitory computer-readable medium comprising:
 code for fragmenting by the processor each of a plurality of packets to be transmitted over the wireless link for a user into arbitrarily sized subsets of less than all the bits in the packet;
 code for determining by the processor a remaining number of bits of each of the plurality of packets to be transmitted over the wireless link; and
 code for scheduling by the processor transmission resources for the user based in part upon the remaining number of bits in each packet being fragmented.

16. An apparatus for facilitating scheduling in a wireless communication environment, comprising:
 memory configured to store a packet generated for a user application, the packet comprising a plurality of information units to be transmitted over a wireless link;
 a hybrid interface configured to fragment the packet into at least two subsets, each containing a different number of more than one but less than all of the information units in the packet, and to generate status information associated with the packet, wherein the status information comprises an indication of a remaining number of bits of the packet yet to be transmitted; and
 a scheduler configured to schedule transmission resources for the fragmented subsets based on the status information.

17. The apparatus of claim 16, wherein the status information comprises a timestamp associated with the generation of the packet.

* * * * *